United States Patent
Shanmugam et al.

(10) Patent No.: US 9,065,819 B1
(45) Date of Patent: Jun. 23, 2015

(54) SINGLE SIGN ON (SSO) AUTHORIZATION AND AUTHENTICATION FOR MOBILE COMMUNICATION DEVICES

(71) Applicant: Cellco Partnership, Basking Ridge, NJ (US)

(72) Inventors: Sankar Shanmugam, Dayton, NJ (US); Petri Virkkula, Kendall Park, NJ (US); Zhidong Lu, Lexington, MA (US); Shan Olachery, Branchburg, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 7 days.

(21) Appl. No.: 14/139,575

(22) Filed: Dec. 23, 2013

(51) Int. Cl.
*H04L 29/06* (2006.01)
*G06F 21/41* (2013.01)
*H04W 12/06* (2009.01)
*G06F 21/31* (2013.01)

(52) U.S. Cl.
CPC ............ *H04L 63/0815* (2013.01); *G06F 21/41* (2013.01); *H04W 12/06* (2013.01); *G06F 21/31* (2013.01)

(58) Field of Classification Search
CPC ..... H04L 64/0815; G06F 21/31; G06F 21/41; H04W 12/06
USPC ....................................................... 726/8, 20
See application file for complete search history.

(56) References Cited

U.S. PATENT DOCUMENTS

| | | | | |
|---|---|---|---|---|
| 2005/0108551 | A1* | 5/2005 | Toomey | 713/185 |
| 2005/0154913 | A1* | 7/2005 | Barriga et al. | 713/201 |
| 2010/0077469 | A1* | 3/2010 | Furman et al. | 726/8 |
| 2011/0092185 | A1* | 4/2011 | Garskof | 455/411 |
| 2012/0291114 | A1* | 11/2012 | Poliashenko et al. | 726/8 |
| 2013/0086669 | A1* | 4/2013 | Sondhi et al. | 726/8 |
| 2014/0082715 | A1* | 3/2014 | Grajek et al. | 726/8 |

* cited by examiner

*Primary Examiner* — Hadi Armouche
*Assistant Examiner* — Dao Ho

(57) ABSTRACT

Single sign on (SSO) functionality is provided across native and hybrid applications executing on a mobile communication device, such that both native and hybrid applications can access authenticated services offered through respective application servers without repeatedly providing authentication credentials. In operation, the mobile device obtains an SSO token from an SSO server providing the SSO functionality, and native applications executing on the mobile device retrieve the SSO token from memory for use in accessing authenticated services. In the case of hybrid applications, an alias is assigned to the mobile device in response to receiving a page request received from the hybrid application. The alias is associated with SSO token of the mobile device in the SSO server, and is used to provide the SSO token directly to the hybrid application from the SSO server such that the hybrid application can use the SSO token for authentication.

16 Claims, 5 Drawing Sheets

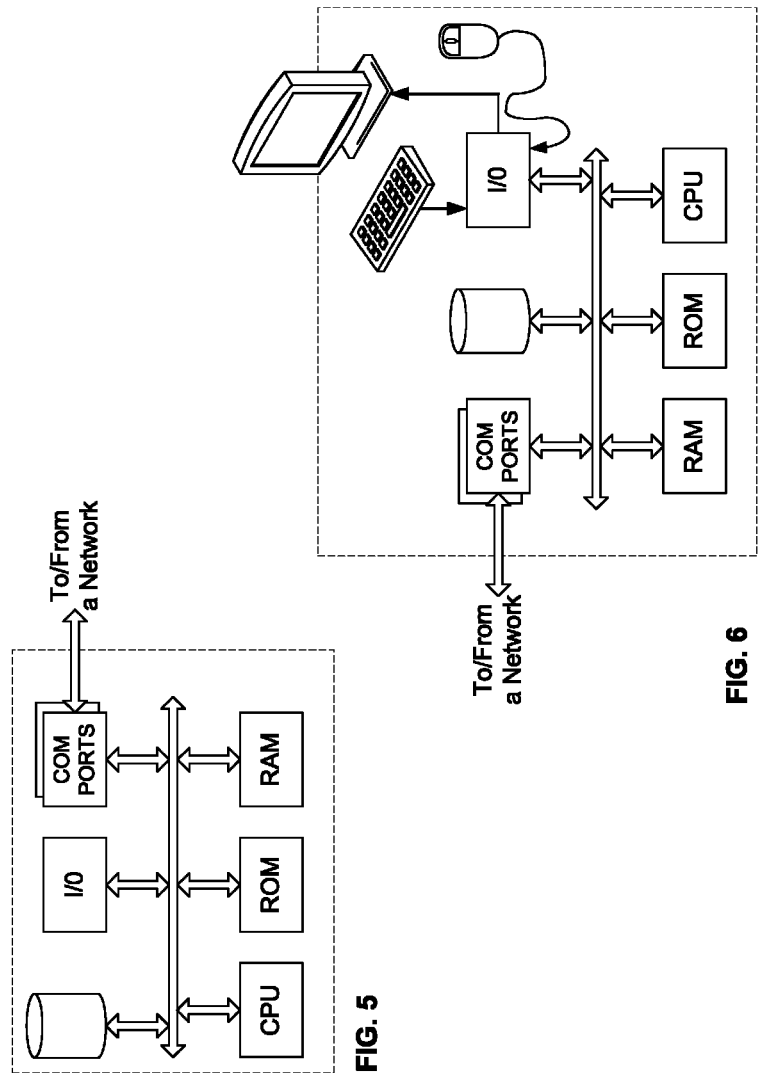

SINGLE SIGN ON (SSO) AUTHORIZATION AND AUTHENTICATION FOR MOBILE COMMUNICATION DEVICES

BACKGROUND

Mobile wireless mobile communication devices such as mobile handsets can have multiple applications concurrently or sequentially running on them. Some applications use secure data as part of their operation, including secure data storing user identification information, account information, payment information, or other data to which user access is to be authorized only for an authenticated user. Each application using the secure data thus needs to validate the user by asking the user for authentication information. A user of multiple applications is therefore presented with a different authentication prompt for each of the applications, thereby causing both inconvenience and frustration to the user required to log in with the same authentication information for each of the multiple applications. Additionally, each one of the applications is sending the same authentication data to a backend server across the communication network, and the repeated transmissions of the authentication data causes unnecessary load on the communication resources of the network and may increase the probability that the authentication data is intercepted and is fraudulently re-used.

Additionally, mobile wireless communication devices execute various types of applications including both native applications and hybrid applications. Native applications are standalone applications that can independently execute on the mobile device. Hybrid applications, on the other hand, can only execute within a container or other application executing on the mobile device such as within a web browser executing on the mobile device. Hybrid applications may be written in hypertext markup language (HTML, or HTML5) code, or the like. Both native and hybrid applications may use secure data as part of their operation, and both types of applications can therefore need to authenticate their users.

A need therefore exists for methods and systems supporting single sign on (SSO) functionalities for automatically authenticating users across applications on mobile communication devices, including across applications of different types such as native/standalone and hybrid/browser-based applications. Specifically, a need exits for enabling a user to provide authentication a single time in order to gain access to multiple different application's secure data and authenticated services and functionalities.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a simplified functional block diagram of a computer that may be configured as a host or server, for example, to function as the SSO server in the system of FIG. 1.

FIG. 6 is a simplified functional block diagram of a personal computer or other work station or terminal device.

DETAILED DESCRIPTION

Figure 1:
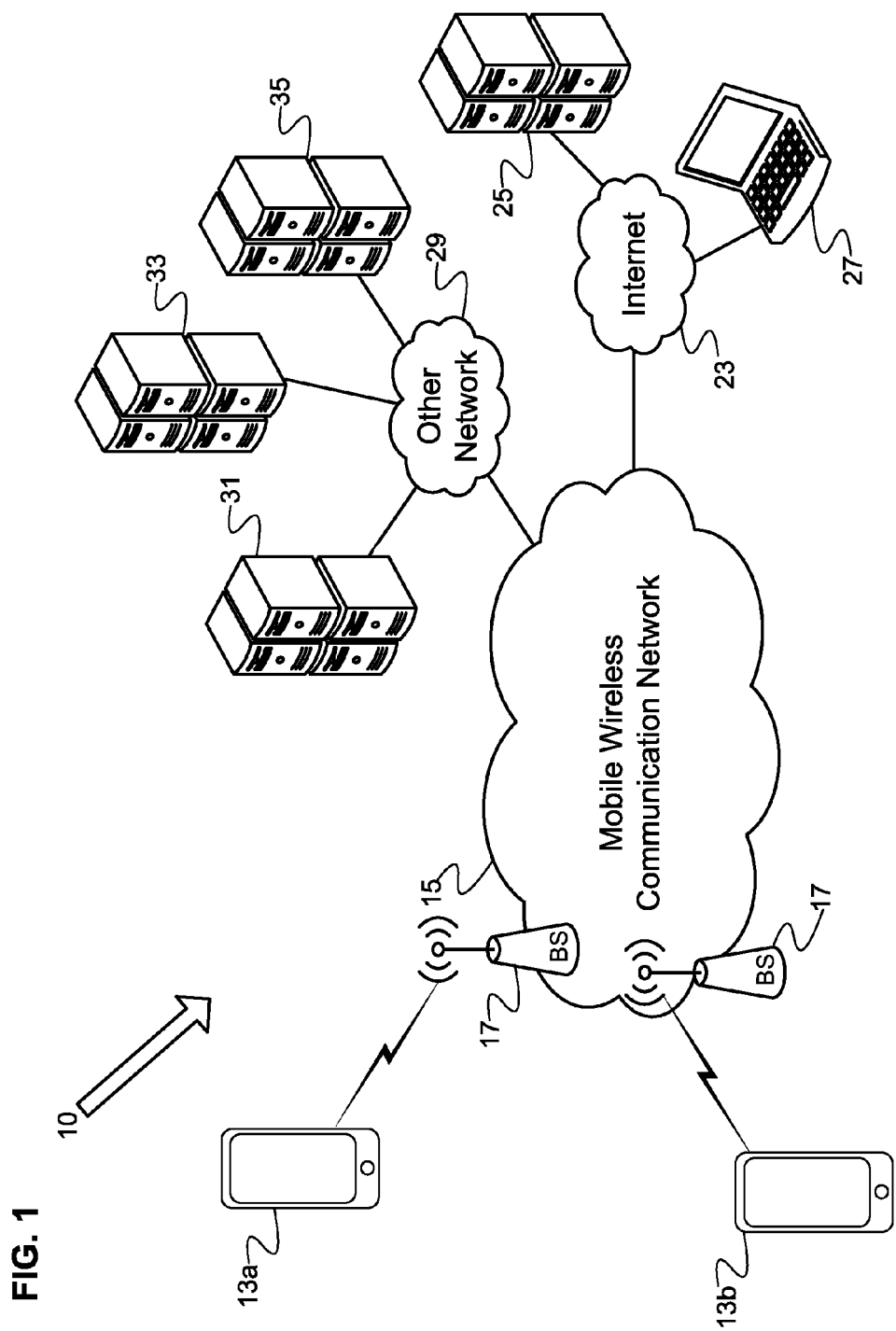
FIG. 1 is a high-level functional block diagram of an example of a system of networks/devices that provide various communications for mobile devices and support an example of the single sign on (SSO) service.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to providing single sign on (SSO) functionality between multiple applications executing on a mobile communication device. The methods and systems enable a user who has provided authentication information (e.g., a username and password) in a first application to be automatically authenticated in a second application without repeatedly providing the authentication information. The first and second applications can both be native or hybrid applications, or can be a native and a hybrid application.

In order to support the SSO functionality, the mobile communication device can execute an SSO service that runs in the background on the device and is operative to obtain an SSO token from an SSO server supporting the SSO functionality. The mobile communication device further executes multiple applications, including native and/or hybrid applications. Each application running on the mobile communication device that is compatible with the SSO service includes the SSO token in communications with a corresponding application server. An SSO plugin on the application server uses the token to authenticate the mobile communication device. Specifically, the SSO plugin retrieves the token from each communication, and provides the token to the SSO server. If valid authentication information (e.g., a valid username and password combination) has previously been provided at the SSO server from the user of the mobile device, the SSO server determines that the token has been authenticated and provides authenticated information to the application server without again requesting authentication information. However, if no authentication information has been provided by the user, the application server prompts the user for the authentication information, provides the received authentication information with the token to the SSO server and, upon successful authentication by the SSO server, receives an authentication acknowledgment from the SSO server. The application server can then provide authenticated services to the mobile device.

In the case of a hybrid application, the SSO-enabled hybrid application transmits a page request to a web application server compatible with the SSO service. In response to receiving the request, an SSO plugin on the web application server obtains an alias for the device from the SSO server. The web application server processes the page request and, in response to the request, sends a login request including the alias to the browser application. If the SSO service is installed on the mobile communication device, the login request provided by the web application server causes the alias to be provided to the SSO service running on the device. In response to receiving the alias, the SSO service generates and transmits to the SSO server a request to register the alias with the token of the mobile device. Once the token of the mobile device is associated with the alias assigned to the mobile device, the hybrid application obtains the token from the SSO server and includes the token in future page requests transmitted to the application server. In turn, the SSO plugin of the application server uses the token included in the page request to automatically authenticate the device. If the token has previously been authenticated by the user, for example by the user providing valid authentication credentials to associate with the token, the application server provides authenticated services to the user without prompting the user for authentication information.

FIG. 1 illustrates a system 10 offering a variety of mobile communication services, including communications for providing SSO functionalities to users of mobile wireless communication devices. The example shows simply two mobile devices 13a and 13b as well as a mobile wireless communication network 15. The mobile devices 13a and 13b (referenced generally as mobile device(s) 13) are examples of user devices that may be used with SSO service. However, the network will provide similar communications for many other similar users as well as for mobile devices/users that do not participate in the SSO service. The network 15 provides mobile wireless communications services to those devices as well as to other mobile devices (not shown), for example, via a number of base stations (BSs) 17. The present techniques may be implemented in any of a variety of available mobile networks 15 and/or on any type of mobile device compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 13 may be capable of voice telephone communications through the network 15, and for the SSO services, the exemplary devices 13a and 13b are capable of data communications through the particular type of network 15 (and the users thereof typically will have subscribed to data service through the network).

The network 15 allows users of the mobile devices such as 13a and 13b (and other mobile devices not shown) to initiate and receive telephone calls to each other as well as through the public switched telephone network to telephone stations connected thereto. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices via the Internet 23 may be with servers and devices like those shown at 25 and 27 as well as with a variety of other types of devices or systems capable of data communications through various interconnected networks. The mobile devices 13a and 13b of users of the SSO service also can receive and execute applications written in various programming languages, as discussed more later.

Reference now is made in detail to the examples illustrated in the accompanying drawings and discussed below. Mobile devices 13a and 13b can take the form of portable handsets, smart-phones or personal digital assistants, although they may be implemented in other form factors. Program applications, including an SSO service used to assist in providing SSO functionality to a mobile device and/or any SSO-enabled application using the SSO functionality on the device, can be configured to execute on many different types of mobile devices 13, and/or mobile devices 13 running different operating systems. For example, a mobile device application can be written to execute on a binary runtime environment for mobile (BREW-based) mobile device, a Windows Mobile based mobile device, device, I-Phone or iOS-based mobile device, Java Mobile, or RIM based mobile device such as a BlackBerry or the like. Some of these types of devices can employ a multi-tasking operating system.

Each mobile device 13a or 13b can execute multiple program applications, including multiple SSO-enabled applications, to run concurrently and/or sequentially on the mobile device. The program applications can include native or standalone applications which are stored as executable program code in a memory of the mobile device, and can be executed alone without support from any other application on the mobile device. The program applications can additionally or alternatively include hybrid applications, such as applications written and stored as hypertext markup language (HTML) code, which are generally executed within a container or other application (e.g., a web browser) executing on the mobile device. Some hybrid application may be executable only within a container or other application. Both standalone and hybrid applications can be installed on a single mobile device, and both can be compatible with the SSO functionalities of the mobile device described herein.

A mobile device can further execute certain applications and/or services in the background. An application or service that is executed in the background is executed without directly notifying a user of the mobile device. Some applications and services running in the background may provide no notification of their execution to the user, while other may provide limited notifications. A service or application running in the background, such as an SSO service providing SSO-related support, may provide services to other applications executing on the mobile device including user-interfacing applications.

The mobile communication network system 10 can be implemented by a number of interconnected networks. Hence, the overall system 10 may include a number of radio access networks (RANs), as well as regional ground networks interconnecting a number of RANs and a wide area network (WAN) interconnecting the regional ground networks to core network elements. A regional portion of the system 10, such as that serving mobile devices 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of the base station and over the airlink with one or more of the mobile devices 13 when the mobile devices are within range. Each base station can include a BTS coupled to several antennae mounted on a radio tower within a coverage area often referred to as a "cell." The BTS is the part of the radio network that sends and receives RF signals to/from the mobile devices 13 that are served by the base station 17.

The radio access networks can also include a traffic network represented generally by the cloud at 15, which carries the user communications and data for the mobile devices 13 between the base stations 17 and other elements with or through which the mobile devices communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network system 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet). Generally, such systems are part of or connected for communication via the private network 29. However, systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

Additionally, a single sign on (SSO) server 35 can be used to support the SSO functionalities described herein. If the mobile service carrier offers the SSO service, the service may be hosted on a carrier operated SSO server 35, for communication via the networks 15 and 29. Alternatively, the SSO service may be provided by a separate entity (alone or through agreements with the carrier), in which case, the service may be hosted on an application server such as server 25 connected for communication via the networks 15 and 23. The SSO server 35 also communicates with the application servers 31 and the authentication server 33 through private network 29 for providing the SSO functionality. In various embodiments, the SSO server 35 either stores an SSO database or is communicatively coupled to the SSO database, such that the SSO server 35 can create, update, and retrieve database entries associated with each of the mobile devices 13 using the SSO service.

A mobile device 13 communicates over the air with a base station 17 and through the traffic network 15 for various voice and data communications, e.g. through the Internet 23 with a server 25 and/or with application servers 31. Servers such as 25 and 31 may provide any of a variety of common application or service functions in support of or in addition to a native or hybrid application program running on the mobile device 13. However, for purposes of further discussion, we will focus on functions thereof in support of the SSO-enabled applications executing on the mobile devices. For a given application, an application program within the mobile device may be considered as a 'client' and the programming at 25 or 31 may be considered as the 'server' application for the particular application or service.

To insure that the application service offered by server 31 is available to only authorized devices/users, the provider of the application service also deploys an authentication server 33. Further, to provide a user with application services by multiple different servers 31 without requiring the user to repeatedly provide login information or authentication credentials, an SSO server 35 is deployed. An SSO plugin installed on each SSO-enabled application server 31 is operative to communicate SSO and authentication-related information to and from the SSO server 35. The authentication server 33 and SSO server 35 could be a separate physical server as shown, or authentication server 33 and/or SSO server 35 could be implemented as another program module running on the same hardware platform as the application server 31. Essentially, when the application server (server 31, in our example) receives a service request from a client application on a mobile device 13, the SSO plugin running on the application server 31 provides appropriate information to the SSO server 35 to allow the SSO server to authenticate the mobile device 13 or a user thereof. The SSO server 35 may verify authentication credentials with the authentication server 33 to allow the application server 33 to authenticate the mobile device 13 as outlined herein. Upon successful authentication, the server 33 informs the SSO server 35, which in turn informs SSO plugins on the application servers 31 to cause the application servers 31 to provide access to authenticated services via data communication through the various communication elements (e.g. 29, 15 and 17) of the system 10. A similar authentication function may be provided for SSO-enabled service(s) offered via the server 25, either by the servers 33 and 35 if there is an appropriate arrangement between the carrier and the operator of server 25, by a program on the server 25, or via separate authentication and SSO servers (not shown) connected to the Internet 23.

Figure 2:
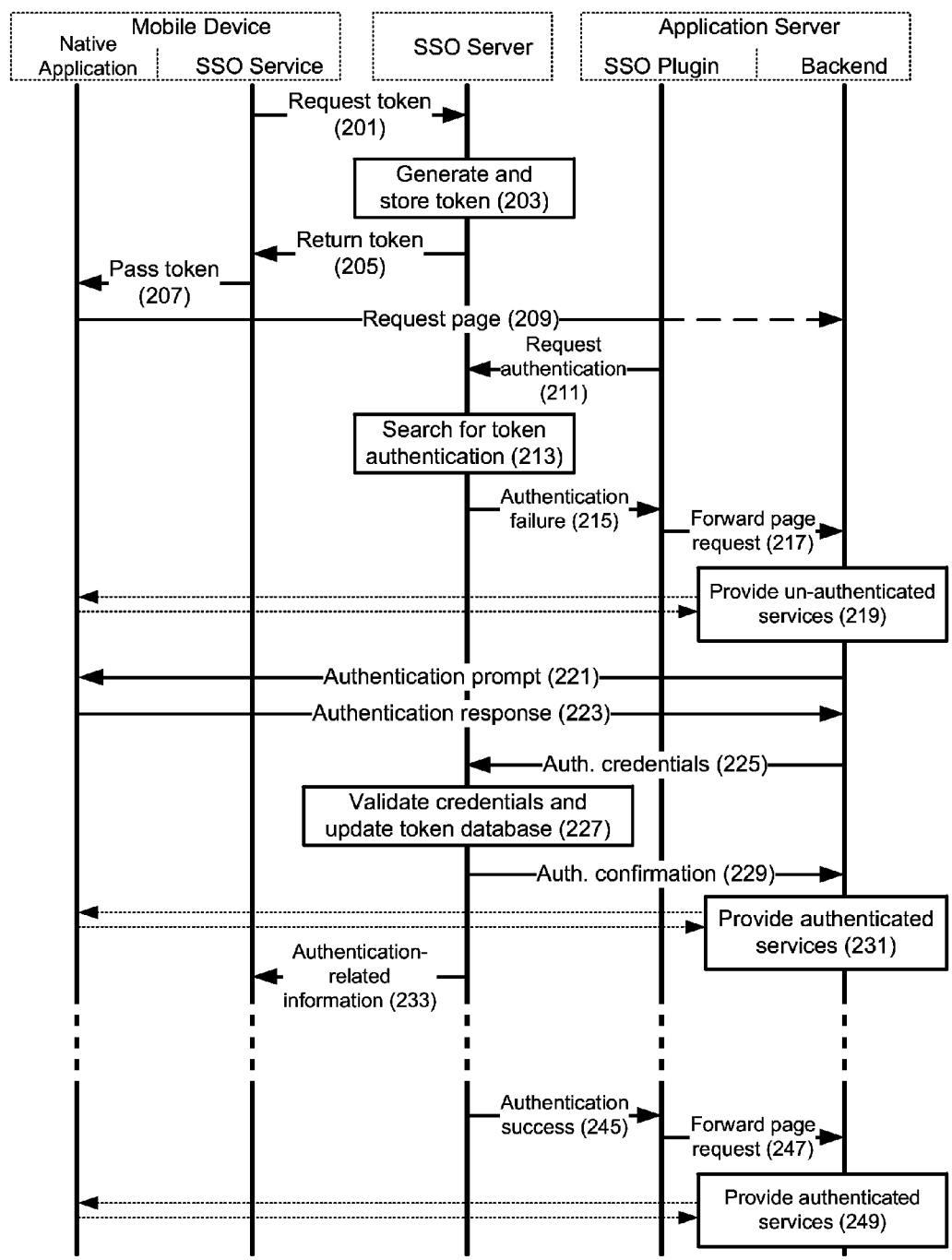
FIG. 2 is a flow diagram illustratively showing steps and communications involved in providing the SSO service to a native or standalone application executing on a mobile communication device.
Figure 3:
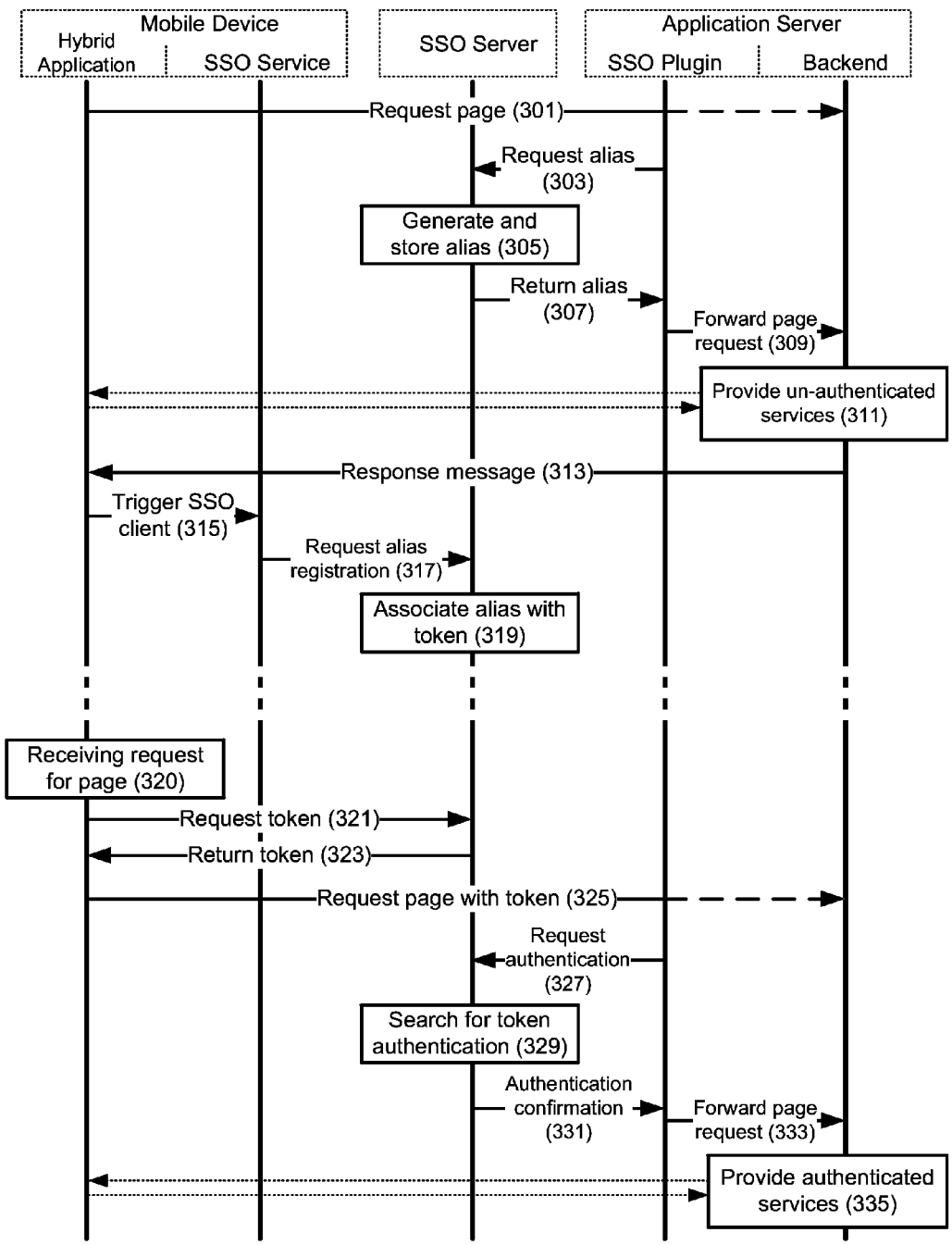
FIG. 3 is a flow diagram illustratively showing steps and communications involved in providing the SSO service for a hybrid application executing on a mobile communication device.

Reference now is made in detail to the examples illustrated in FIGS. 2 and 3 and showing steps and communications in providing SSO functionalities for various types of applications running on a mobile device.

FIG. 2 is a flow diagram illustratively showing steps and communications involved in providing the SSO service to a native or standalone application executing on a mobile communication device 13.

In the method 200 shown in FIG. 2, the mobile device 13 is configured to execute both the native application, such as a standalone application, and the SSO service. The SSO service generally is a service that executes in the background on the mobile device, such that a user of the mobile device may or may not be cognizant of the SSO service's execution. The SSO service may begin execution upon boot-up of the mobile device, upon activation (e.g., user-initiated activation) of an SSO-enabled application that is compatible with the SSO service, or in response to another appropriate trigger.

Upon activation of the SSO service, the service automatically generates a request for a device SSO token and transmits the request across the mobile communication network to the SSO server 35 in step 201. The token request message includes one or more identifiers for uniquely identifying the mobile device 13, such as identification of an MDN or MIN associated with the mobile device, a device identifier of the mobile device, and/or the like. In response to receiving the request, the SSO server 35 generates a token in step 203. In general, a token is randomly generated and assigned to the mobile device. The token is unique to the mobile device, and the SSO server 35 ensures that no identical token is assigned to another mobile device. The SSO server 35 stores the token in association with the mobile device identifiers in an SSO database, and returns the generated token to the mobile communication device 13 in step 205. Upon receipt of the token, the mobile device 13 stores the token in memory for future use by the SSO service and/or by SSO-enabled native applications running on the device.

When a native application compatible with the SSO service is launched on the mobile device 13 (e.g., an SSO-enabled application), the SSO service provides the token to the native application in step 207. The native application may request the token from the SSO service, or retrieve the token from a predetermined location in memory. Alternatively, the SSO service may automatically pass the token to the native application. As part of the application's operation, the native application generates a page request for obtaining application-related data from an application server associated with the application in step 209. For example, a retail application of a particular retailer may generate a page request to obtain data from an application server of the retailer. The application includes the token in the request, such that the token is communicated with the request to the application's corresponding application server across the mobile communication network.

Upon receiving the page request in the application server, an SSO plugin of the application server processes the request to retrieve the token from the request. The SSO plugin generates an authentication request including the token, and transmits the authentication request to the SSO server in step 211. The authentication request seeks to obtain authentication of the device from which the page request was received in step 209. In response to receiving the authentication request, the SSO server searches the SSO database for a database entry associated with the token included in the authentication request in step 213. Upon locating the database entry, the SSO server determines whether the device associated with the token is authenticated. Specifically, the SSO server determines whether the database entry stores authentication information for the device. If authentication information is not stored, control proceeds to step 215. However, if authentication information is stored, control proceeds to step 245.

In step 215, upon determining that the SSO database does not store authentication information for the token, the SSO server generates an authentication failure message in step 215. The authentication failure message is transmitted to the application server for receipt by the SSO plugin. Upon receipt of the authentication failure message in step 217, the SSO plugin forwards the page request received in step 209 to the application server's backend for processing of the request. The forwarded message may optionally include an indication that the authentication failed. In response to receiving the page request, the application server backend processes the request and provides un-authenticated services to the application running on the mobile device in step 219. The un-authenticated services may include any services for which user authentication is not required, including any services that are not reserved for authenticated users. For example, in the case of a retail application, the un-authenticated services may include providing information on products and services offered by the retailer, and/or services generally provided to guest users. The un-authenticated services, however, will generally not enable a user to access account-related information, to perform a payment, ordering, or checkout operation, or the like. The providing of un-authenticated services may include receiving further page requests from the mobile device application in the application server, processing the page requests to generate page request responses, and transmitting the page request responses to the mobile device application through the mobile communication network.

The processing by the application server of the initial page request (transmitted to the application server in steps 209 and 217), or of a later page request transmitted by the mobile device application to the application server (e.g., a page request transmitted in step 219), may require user authentication if the request seeks to access authenticated services. Upon determining that processing and/or responding to the page request involves providing authenticated services, the application server backend verifies the authentication status of the mobile device. In particular, the application server backend determines whether the page request (e.g., the forwarded page request of step 217) includes authentication information for the mobile device or an authentication confirmation from the SSO server. Upon determining that the page request does not include authentication information for the mobile device, the application server backend determines that the user and/or mobile device are not authenticated. The application server thus generates and transmits to the mobile device application an authentication prompt in step 221. The authentication prompt generally includes a request for a username and password, or other set of authentication credentials, from the user of the mobile device. In response to transmitting the prompt, the mobile device application retrieves authentication credentials from a memory of the mobile device, obtains authentication credentials from a user of the mobile device (e.g., through a user interface of the mobile device), or the like. Once obtained, the authentication credentials including the token are transmitted to the application server backend in an authentication response in step 223.

Upon receiving the authentication response, the application server forwards the authentication credentials to the SSO server in step 225. Upon receiving the authentication credentials, the SSO server validates the credentials in step 227. The validation may include forwarding the authentication credentials to an authentication server, and receiving an authentication response from the authentication server. If the authentication response indicates that the authentication was successful, the SSO server updates the SSO database. In particular, the SSO server updates the SSO database entry associated with the token corresponding to the mobile device to indicate that the device and token are authenticated. Once the database is updated, the database entry enables any communication including the token to be automatically authenticated by the SSO server without requiring authentication credentials to be obtained from the mobile device or mobile device user. The SSO database entry may further store authentication related information which may include the authentication credentials, a username or other identifier associated with the authentication credentials and/or an associated user account, or the like. The SSO server further generates and transmits to the application server an authentication confirmation message in step 229. The authentication confirmation message includes an indication that the mobile device has been successfully authenticated. The authentication confirmation message can optionally include a username or other identifier associated with the authentication credentials and/or an associated user account. Upon receiving the authentication confirmation message, the application server backend can provide authenticated services to the mobile device application in step 231.

In response to successfully authenticating the mobile device in step 227, the SSO server can generate an optional message including a username or other identifier associated with the authentication credentials and/or an associated user account, or other authentication-related information. The optional message is transmitted directly to the SSO service on the mobile device in step 233. Upon receipt of the message, the SSO service can display an authentication confirmation message for a user of the mobile device on a display screen of the mobile device. The SSO service may further provide the user with a log-out option that enables the user to end the SSO authentication at any time.

Once an SSO database entry associated with a token corresponding to a mobile device indicates that the device and token are authenticated, all SSO-enabled applications running on the mobile device can access authenticated services without providing authentication credentials. Hence, a native application running on the mobile device, such as the application involved in processing steps 207-231 described above or any other SSO-enabled application executing on the device, may generate a page request including the token substantially similarly as in step 209. Processing will then proceed substantially similarly to steps 209-213. In step 213, however, the SSO server's search of the SSO database returns the database entry indicating that the token is authenticated. Upon determining that the token is authenticated, the SSO server proceeds to step 245 and generates an authentication success message. The authentication success message includes an indication that the mobile device and token are authenticated. The authentication success message can optionally include the username or other identifier associated with the authentication credentials and/or an associated user account. Upon receiving the authentication success message, the SSO plugin of the application server forwards the page request in step 247. The forwarded page request includes an indication that the mobile device and token are authenticated, and can further include the username or other identifier associated with the authentication credentials and/or an associated user account. In step 249, the application server backend provides authenticated services to the mobile device application upon receiving the notification from the SSO plugin that the mobile device is authenticated.

In the method 200, the SSO functionality enables multiple applications installed on a mobile device to access authenticated services while prompting a user of the mobile device to provide authentication credentials only a single time. As such, the user does not have to provide authentication credentials in each application. Further, the authentication prompt through which the user provides authentication credentials is provided directly by the application server and/or mobile device application currently being used by the user, and can thus be an authentication prompt that is native to the application. In particular, the authentication prompt can be fully integrated into the application, and have the same look and feel as the application. The authentication prompt is not provided directly by the SSO server, and the user's providing of authentication credentials does not require interacting with a user interface different from that of the application in use by the user of the mobile device. For example, the providing of authentication credentials does not require interacting with a user interface generated by the SSO server or SSO service, and which may have a different look and feel than the mobile device application.

The flow diagram described in relation to FIG. 2 describes an operation flow for a native application executing on the mobile device and using the SSO functionalities. The native application is operative to obtain the SSO token on the mobile device either directly from the SSO service, from a memory of the mobile device, or the like. In the case of hybrid applications, however, the hybrid application operates within a container on the mobile device and does not necessarily have access to all resources of the mobile device. In particular, the hybrid application is typically unable to retrieve the SSO token from the memory of the mobile communication device, or to receive the SSO token from the SSO service executing on the mobile device. As such, a different method detailed in FIG. 3 can be used to enable the hybrid application to obtain the SSO token.

FIG. 3 is a flow diagram illustratively showing steps and communications involved in providing the SSO service for a hybrid application executing in a native application container on a mobile communication device. The processes implemented by methods 200 and 300 are generally used in conjunction with each other on a same mobile device to enable both native and hybrid applications to receive SSO services. In particular, SSO-enabled native applications may function according to method 200, while SSO-enabled hybrid applications may function according to method 300 on a same mobile device.

In the method 300 shown in FIG. 3, the mobile device 13 is configured to execute both the hybrid application and an SSO service. In one example, the hybrid application is an application that runs in a browser or other container of the mobile device, such as a hypertext markup language (HTML, or HTML5) application, a JavaScript application, or the like. As part of the execution of the hybrid application, the hybrid application running on the mobile device generates a page request for obtaining application-related data from an application server associated with the hybrid application in step 301. The page request is transmitted to the application server associated with the hybrid application.

Upon receiving the page request in the application server, an SSO plugin of the application server processes the request. The SSO plugin determines that the page request does not include a token and, in response to the determination, generates an alias request message in step 303. The alias request message may include identification of the mobile device and/or application from which the page request was received. The alias request message is transmitted to the SSO server. In response to receiving the alias request, the SSO server generates a new alias in step 305. The alias can be randomly generated and assigned, sequentially generated based on the last-generated alias, generated based on identifiers for the mobile device and/or application received in the request, or the like. The alias is unique, and the SSO server ensures that all aliases stores in the SSO database are unique and different from each other. The SSO server stores the alias in association with any received mobile device and/or application identifiers in the SSO database, and returns the generated alias to the application server in step 307. Upon receipt of the alias, the application server's SSO plugin forwards the page request received in step 301 to the application server's backend for processing of the request. The forwarded message includes the alias.

In response to receiving the page request, the application server backend processes the request and can provide un-authenticated services to the hybrid application on the mobile device in step 311. As part of providing un-authenticated services, and/or in response to a request for an authenticated service, the application server backend generates a response message in step 313. The response message may be a response to the page request of steps 301 and 309, or another response message for transmission to the hybrid application running on the mobile device. In response to receiving the response message, the hybrid application on the mobile device processes the response. The processing generally includes background processing, and may additionally include the generation of user interface elements for presentation to a user of the mobile device. The response message includes the alias received in the forwarded page request of step 309, which can be stored by the hybrid application upon receipt.

In addition to the alias, the response message includes an instruction for causing the mobile device to communicate the alias to the SSO service executing on the mobile device. As a result, receipt of the response message in the mobile device triggers the alias to be communicated to the SSO service in step 315. In one example, the instruction may cause the hybrid application to send the alias to the SSO service. In general, however, the hybrid application executes within a container on the mobile device and may therefore not have sufficient permissions to send communications to the SSO service. As a result, in another example, an operating system of the mobile device executing the hybrid application (e.g., an Android-based or iOS operating system) includes functionality for enabling the alias to be communicated to the SSO service. In particular, the operating system may be configured to automatically redirect calls to certain universal resource locator (URL) addresses to the SSO service. In the example, calls to URLs beginning with "mapsso://" may thus be automatically redirected by the operating system to the SSO service. Hence, the response message of step 313 may include a call to a URL beginning with "mapsso://" and including the alias, such as the URL: "mapsso://mapalias?alias=<aliasvalue>" where the alias generated in step 305 is inserted as the <aliasvalue>. Note that while the SSO service trigger in FIG. 3 is shown as originating in the hybrid application, the trigger may alternatively originate in the operating system or other appropriate location in the mobile device. The communication of the alias to the SSO service is typically performed in the background without notification to a user of the mobile device.

In response to receiving the trigger including the alias in step 315, the SSO service stores the alias and generates a request to associate the alias with an SSO token of the device. The alias registration request includes the alias as well as the token generated for the mobile device and returned to the device in step 205. The alias registration request is transmitted by the SSO service to the SSO server in step 317. In general, the SSO service will already have received a token prior to step 315 as a result of performing steps 201-205 of FIG. 2, and the alias registration request identifies both the alias assigned to the mobile device and the token assigned to the mobile device. However, if the SSO service does not already store a token, receipt of the trigger in step 315 may cause the SSO service to perform steps 201-205 in order to obtain a token prior to generating the alias registration request. The processing of step 315 is typically performed without providing any associated notifications to a user of the mobile device. However, in some examples, the SSO service executing on the mobile device may inform the user that an SSO authentication procedure is ongoing, for example by causing a pop-up notification to be presented to the user. In situations in which the SSO service already stores an SSO token for the mobile device in step 315, and in which the SSO service further stores authentication-related information relating to the SSO token (such as the information received in step 233 of method 200), the SSO service may additionally provide confirmation to the user of the mobile device that the SSO token has previously been validated, and that SSO authentication has been successful with respect to the hybrid application.

The SSO server receives the alias registration request, and in response to the request associates the token with the alias in the SSO database in step 319. In particular, the SSO server may search for a database entry associated with the token or with the alias, and may update the database entry to associate the token and alias in the SSO database. Once the association is performed, the SSO server can retrieve the token associated with the alias in response to receiving a communication including the alias from an SSO plugin of an application server, determine whether the token associated with the received alias has been authenticated, and thereby provide an alias-based authentication response to the SSO plugin of the application server.

Following the alias registration, the hybrid application executing on the mobile device may request the token associated with the alias from the SSO server in step 321. The hybrid application may generate and transmit the token request a predetermined time after receiving the response message of step 313 (e.g., a predetermined time that is selected to be long enough for steps 315-319 to be completed). In general, however, the hybrid application generates and transmits the token request in response to receiving a request to generate a page request in step 320.

The page request of step 320 may result from a user interaction with the hybrid application, such as a click, selection, text-input, or the like, received as the hybrid application provides un-authenticated services to the user of the mobile device and resulting in the hybrid application requesting additional information from the application server to respond to the user interaction. The page request of step 320 may more generally result from processing by the hybrid application resulting in the hybrid application requesting additional information from the application server through a page request.

In preparation for generating the page request, the hybrid application requests the token associated with the alias in step 321 by generating a token request message including the alias and transmitting the token request message to the SSO server. The token request message can be an Ajax call generated and transmitted in the background without notifying the user of the mobile device. In response to receiving the token request message, the SSO server searches the SSO database for the token associated with the alias included in the request, retrieves the token from the SSO database, and returns the token to the hybrid application in a response message in step 323. In some examples in which the token is identified in the SSO server as having been previously authenticated, the token received by the hybrid application in step 323 includes a username or other authentication-related information associated with the authentication credentials stored in the SSO server for the token. Upon receipt of the token and authentication-related information, the hybrid application can optionally display an authentication confirmation message for a user of the mobile device on a display screen of the mobile device. The authentication confirmation message can inform the user that the SSO authentication of the user was successful for the hybrid application, and can include the username or other user identifier under which the user is authenticated. One or both of the hybrid application and the SSO service may further provide the user with a log-out option that enables the user to end the SSO authentication at any time.

In response to receiving a request for a page in step 320, the hybrid application additionally generates a request for the page for transmission to the application server in step 325. If the hybrid application does not have the token of the mobile device, the hybrid application proceeds to step 321 described above. However, once the hybrid application has received the token in step 323, the application generates the page request to include the token in step 325. In turn, the request including the token is transmitted to the application server in step 325.

Upon receiving the page request of step 325 in the application server, the SSO plugin of the application server processes the request. The SSO plugin determines that the page request includes a token and, in response to the determination, generates an authentication request message in step 327. The authentication request message includes the token, and may optionally include identification of the mobile device and/or application from which the page request was received. The authentication request message is transmitted to the SSO server. In response to receiving the authentication request, the SSO server searches the SSO database for the token received in the request in step 329, and determines whether the token is authenticated based on the SSO database entry of the token.

Upon determining that the token is authenticated, the SSO server transmits an authentication confirmation to the application server in step 331. The authentication confirmation message includes an indication that the mobile device and token are authenticated. The authentication success message can optionally include the username or other identifier associated with the authentication credentials and/or an associated user account. Upon receiving the authentication success message, the SSO plugin of the application server forwards the page request in step 333. The forwarded page request includes an indication that the mobile device and token are authenticated, and can further include the username or other identifier associated with the authentication credentials and/or an associated user account. In step 335, the application server backend provides authenticated services to the mobile device application upon determining that the mobile device is authenticated.

In some examples, the SSO server determines that the token is not authenticated in step 329. For example, in examples in which a new token is caused to be generated by the SSO server in steps 315/317, the newly generated token is not authenticated. If the SSO server determines that the token is not authenticated, the SSO server generates an authentication failure message for transmission to the application server. The authentication failure message is substantially similar to the authentication failure message transmitted in step 215. Operational (and communication) flow between the hybrid application and application server may then substantially mirror the operation flow of steps 215-231 of method 200 in order to obtain authentication credentials for the user through the hybrid application, and to validate the credentials in view of providing authenticated services to the hybrid application.

Once the SSO database entry associated with a token corresponding to a mobile device indicates that the device and token are authenticated, all SSO-enabled applications running on the mobile device can access authenticated services without providing authentication credentials. As such, both native and hybrid applications may access authenticated services through the use of the SSO token without repeatedly providing authentication credentials. As such, if a user has provided authentication credentials through a native application (e.g., as described in relation to steps 221-227 of method 200), all SSO-enabled native applications and all SSO-enabled hybrid applications on the mobile device may access authenticated services without providing authentication credentials. Similarly, if the user has provided authentication credentials through a hybrid application (e.g., as described in the preceding paragraph), all SSO-enabled native applications and all SSO-enabled hybrid applications on the mobile device may access authenticated services without providing authentication credentials.

The SSO functionality under consideration here may be delivered to various types of mobile devices 13a, and 13b. Further, implementation of the SSO functionality involves at least some execution of programming in the mobile devices as well as implementation of user input/output functions and data communications through the network 15, from the mobile devices.

Figure 4:
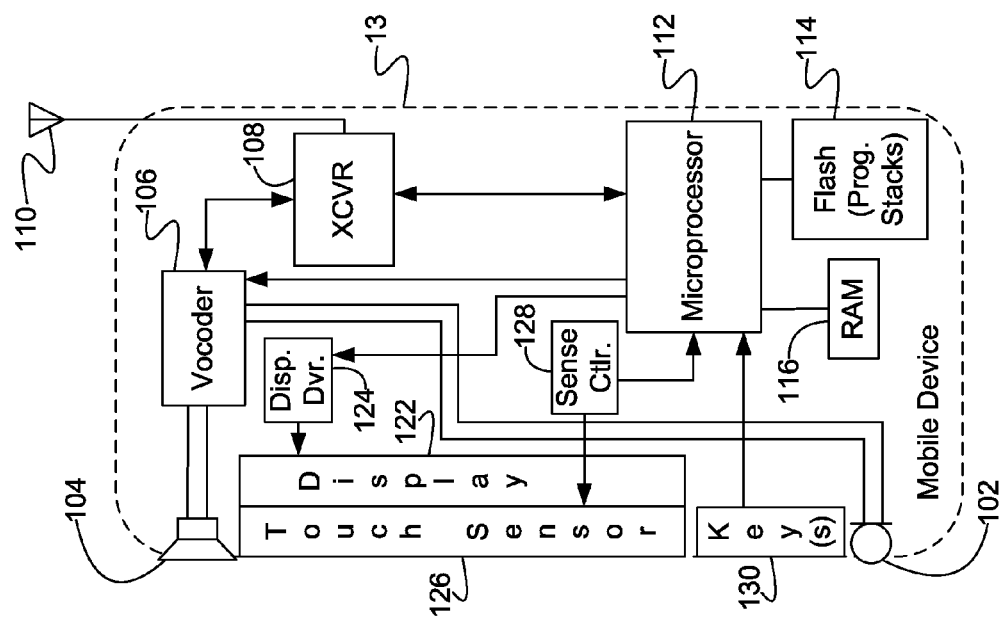
FIG. 4 is a high-level functional block diagram of an exemplary mobile device as may utilize the SSO service through a network/system like that shown in FIG. 1.

FIG. 4 provides a block diagram illustration of an exemplary mobile device 13. Although the mobile device 13 may be a smart-phone or may be incorporated into another device, such as a personal digital assistant (PDA) or the like, for discussion purposes, the illustration shows the mobile device 13 is in the form of a handset. The handset embodiment of the mobile device 13 functions as a normal digital wireless telephone station. For that function, the device 13 includes a microphone 102, speaker 104, and voice coding and decoding circuitry (vocoder) 106 for audio signal input and output.

For digital wireless communications, the handset 13 also includes at least one digital transceiver (XCVR) 108. Today, the handset 13 would be configured for digital mobile wireless communications using one or more of the common network technology types. The concepts discussed here encompass embodiments of the mobile device 13 utilizing any digital transceivers that conform to current or future developed digital wireless communication standards. The mobile device 13 may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13 and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13 may include more than one transceiver each providing wireless communication capabilities according to different protocols or standards. For example, the mobile device 13 can include both a digital mobile wireless transceiver 108 and a WiFi transceiver for communication with a hotspot or WiFi router. The transceivers may share a single antenna 110, or each may have its own respective antenna.

The mobile device 13 includes a display 122 for displaying messages, menus or the like, including display screens generated by native and hybrid applications executing on the mobile device and by the SSO service executing on the mobile device as part of SSO service functionalities. A limited number of key(s) 130 and a touchscreen display arrangement are provided for generating user selection inputs. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display. Hence, the exemplary mobile device 13 includes the display 122, which the microprocessor 112 controls via a display driver 124, to present visible outputs to the device user. The mobile device 13 also includes a touch/position sensor 126. The sensor 126 is relatively transparent, so that the user may view the information presented on the display 122. A sense circuit 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13. The microphone 102 and speaker 104 may be used as additional user interface elements, for audio input and output. As such, various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during operation of native and hybrid applications on the mobile device receiving SSO services. For example, the user interface may be used to prompt a user for authentication credentials, and to obtain credentials entered by the user through the input elements of the interface.

A microprocessor 112 serves as a programmable controller for the mobile device 13, in that it controls all operations of the mobile device 13 in accord with programming that it executes, for all normal operations, and for operations involved in the provision of SSO services under consideration here. In the example, the mobile device 13 includes flash type program memory 114, for storage of various "software" or "firmware" program routines and mobile configuration settings, such as executable code of the SSO service, native applications, and hybrid applications installed on the device. The mobile device 13 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13 includes a processor, and programming stored in the flash memory 114 configures the processor so that the mobile device is capable of performing various desired functions, including in this case the functions involved in the technique for providing SSO services.

As shown by the above discussion, functions relating to the enhanced user-authentication or device-authentication experience through the SSO service, for native and hybrid applications executing on a mobile device, may be implemented on computers connected for data communication via the components of a packet data network, operating as an application server and/or as an SSO server as shown in FIG. 1. Although special purpose devices may be used, such devices also may be implemented using one or more hardware platforms intended to represent a general class of data processing device commonly used to run "server" programming so as to implement the application server functions or the SSO server functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files stored in the SSO database. The software code is executable by the general-purpose computer that functions as the application server, the SSO server, and/or that functions as a user terminal device (e.g., a mobile device). In operation, the code is stored within the general-purpose computer platform. At other times, however, the software may be stored at other locations and/or transported for loading into the appropriate general-purpose computer system. Execution of such code by a processor of the computer platform enables the platform to implement the methodology for providing the SSO service functionalities in essentially the manner performed in the implementations discussed and illustrated herein.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods for SSO authentication outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the SSO server or application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the SSO database of the SSO server. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:

transmitting, from the mobile communication device to an application server associated with one application among a native application executing on the mobile communication device and a hybrid application executing in a native application container on the mobile communication device, authentication credentials for a user of the mobile device and a single sign on (SSO) token for authenticating the mobile communication device in communications with application servers;

in response to transmitting the authentication credentials and the SSO token to the application server associated with the one application, receiving services reserved for authenticated users of the one application from the application server associated with the one application;

following the transmitting of the authentication credentials and the SSO token to the application server associated with the one application, transmitting, from the mobile communication device to an application server associated with another application among the native application executing on the mobile communication device and the hybrid application executing in the native application container on the mobile communication device, the SSO token without the authentication credentials; and in response to transmitting the SSO token without the authentication credentials to the application server associated with the other application, receiving services reserved for authenticated users of the other application from the application server associated with the other application;

receiving, in the mobile communication device from the application server associated with the hybrid application, an alias assigned to the mobile communication device; and in response to requesting a token associated with the alias from an SSO server in communication with the application servers, receiving in the hybrid application the SSO token from the SSO server, wherein the native application is configured to retrieve the SSO token from a memory of the mobile communication device, and the hybrid application executing in the native application container on the mobile communication device is not configured to retrieve the SSO token from the memory of the mobile communication device.

2. The method of claim 1, further comprising:
receiving user input of the authentication credentials in a user interface of the one application among the native application and the hybrid application executing on the mobile communication device,
wherein the authentication credentials received as user input are transmitted to the application server associated with the one application.

3. The method of claim 1, further comprising:
in response to receiving the alias assigned to the mobile communication device, automatically causing an SSO service running on the mobile communication device to transmit an alias registration request to the SSO server to associate the alias with the SSO token of the mobile device in the SSO server,
wherein the alias registration request includes the alias.

4. The method of claim 3, wherein the alias registration request further includes the SSO token of the mobile device.

5. The method of claim 1, wherein the transmitting the authentication credentials and the SSO token comprises:
transmitting a first page request including the SSO token from the one application to the application server associated with the one application;
responsive to transmitting the first page request, receiving from the application server associated with the one application a request for authentication credentials of the user of the mobile device;
obtaining from the user, in the one application among the native application and the hybrid application, the authentication credentials; and
transmitting the obtained authentication credentials to the application server associated with the one application.

6. The method of claim 1, further comprising:
receiving in the mobile communication device, in response to a request from the mobile communication device to an SSO server for the SSO token, the SSO token for authenticating the mobile communication device in communications with application servers.

7. A mobile communication device comprising:
a processor;
a user interface for receiving commands from a user and displaying information to the user;
a mobile wireless communication interface for communicating across a mobile wireless communication network with a plurality of application servers; and
a memory storing instructions for execution on the processor, wherein execution of the instructions causes the processor to:
transmit, to an application server associated with one application among a native application executing on the mobile communication device and a hybrid application executing in a native application container on the mobile communication device, authentication credentials for the user of the mobile device and a single sign on (SSO) token for authenticating the mobile communication device;
in response to transmitting the authentication credentials and the SSO token to the application server associated with the one application, receive services reserved for authenticated users of the one application from the application server associated with the one application;
following the transmitting of the authentication credentials and the SSO token to the application server associated with the one application, transmit, to an application server associated with another application among the native application executing on the mobile communication device and the hybrid application executing in the native application container on the mobile communication device, the SSO token without the authentication credentials; and
in response to transmitting the SSO token without the authentication credentials to the application server associated with the other application, receive services reserved for authenticated users of the other application from the application server associated with the other application;
receive, from the application server associated with the hybrid application, an alias assigned to the mobile communication device; and
in response to requesting a token associated with the alias from an SSO server in communication with the application servers, receive in the hybrid application the SSO token from the SSO server, wherein the native application is configured to retrieve the SSO token from a memory of the mobile communication device, and the hybrid application executing in the native application container on the mobile communication device is not configured to retrieve the SSO token from the memory of the mobile communication device.

8. The mobile communication device of claim 7, wherein execution of the instructions further causes the processor to:
receive, through the user interface, user input of the authentication credentials in a user interface of the one application among the native application and the hybrid application executing on the mobile communication device,
wherein the authentication credentials received as user input are transmitted to the application server associated with the one application.

9. The mobile communication device of claim 7, wherein execution of the instructions further causes the processor to:
in response to receiving the alias assigned to the mobile communication device, automatically cause an SSO service running on the mobile communication device to transmit an alias registration request to the SSO server to associate the alias with the SSO token of the mobile device in the SSO server,
wherein the alias registration request includes the alias.

10. The mobile communication device of claim 7, wherein the transmitting the authentication credentials and the SSO token comprises:
transmitting a first page request including the SSO token from the one application to the application server associated with the one application;
responsive to transmitting the first page request, receiving from the application server associated with the one application a request for authentication credentials of the user of the mobile device;
obtaining from the user, in the one application among the native application and the hybrid application, the authentication credentials; and
transmitting the obtained authentication credentials to the application server associated with the one application.

11. A method comprising:
generating, in a single sign on (SSO) server communicatively coupled to a plurality of mobile devices and a plurality of application servers, an SSO token for use in authenticating one of the plurality of mobile devices;
providing the generated SSO token to the one mobile device for use in authenticating the mobile device with application servers associated with native applications executing on the one mobile device;

generating in the SSO server, in response to receiving a request from an application server associated with a hybrid application configured for execution in native application containers of mobile devices, an alias for uniquely identifying a mobile device having transmitted a request to the application server associated with the hybrid application;

associating the generated alias with the generated SSO token of the one mobile device in response to receiving a registration request including the generated alias from the one mobile device; and providing the generated SSO token to the hybrid application on the one mobile device, for use in authenticating the mobile device with the application server associated with the hybrid application, in response to receiving a request for the token from the hybrid application on the mobile device;

providing, to the mobile device, instructions for receiving, in the mobile communication device from the application server associated with the hybrid application, the alias assigned to the mobile communication device; and providing, to the mobile device, instructions for in response to requesting a token associated with the alias from the SSO server in communication with the application servers, receiving in the hybrid application the SSO token from the SSO server, wherein the native application is configured to retrieve the SSO token from a memory of the mobile communication device, and the hybrid application executing in the native application container on the mobile communication device is not configured to retrieve the SSO token from the memory of the mobile communication device.

12. The method of claim 11, further comprising:

receiving, from one of the plurality of application servers, an authentication request including an SSO token for authentication;

transmitting an authentication failure message to the one application server in response to determining based on a database of SSO tokens that the SSO token for authentication has not been authenticated.

13. The method of claim 11, further comprising:

receiving, from the one application server, an authentication request including an SSO token for authentication and authentication credentials;

updating a database of SSO tokens to indicate that the SSO token for authentication is authenticated upon validating the authentication credentials; and transmitting an authentication success message to the one application server upon validating the authentication credentials.

14. The method of claim 13, further comprising:

receiving, from another of the plurality of application servers, an authentication request including the SSO token for authentication without authentication credentials;

transmitting an authentication success message to the other application server in response to determining based on the database of SSO tokens that the SSO token for authentication has been authenticated.

15. The method of claim 14, wherein the one application server is an application server associated with a native application executing on the one mobile device, and the other application server is an application server associated with the hybrid application configured for execution in a native application container on the mobile device.

16. The method of claim 14, wherein the one application server is an application server associated with the hybrid application configured for execution in a native application container on the mobile device, and the other application server is an application server associated with a native application executing on the one mobile device.

* * * * *